(12) United States Patent
Saraswat et al.

(10) Patent No.: US 9,059,894 B2
(45) Date of Patent: Jun. 16, 2015

(54) DATA EXCHANGE TECHNOLOGY

(75) Inventors: Saurabh Saraswat, Maharashtra (IN);
Kirti Deshmukh, Warje (IN);
Arunkumar Balakrishnan, Tamil Nadu (IN); Venkatesh Nelamangala Krishnamurthy, Melbourne (AU); Alex Wang, NSW (AU); Eckard Busch, Bellevue Hill (AU); Naresh Kumar Shastri, Bengaluru (IN); Sonal Bante, Pune (IN)

(73) Assignee: Accenture Global Services Limited, Dublin (IE)

( * ) Notice: Subject to any disclaimer, the term of this patent is extended or adjusted under 35 U.S.C. 154(b) by 191 days.

(21) Appl. No.: 13/598,947

(22) Filed: Aug. 30, 2012

(65) Prior Publication Data

US 2013/0173918 A1 Jul. 4, 2013

(30) Foreign Application Priority Data

Sep. 2, 2011 (IN) .............................. 3012CHE2011

(51) Int. Cl.
*H04L 12/24* (2006.01)
*H04L 29/06* (2006.01)
*H04L 29/08* (2006.01)

(52) U.S. Cl.
CPC ................ *H04L 41/02* (2013.01); *H04L 63/08* (2013.01); *H04L 63/0435* (2013.01); *H04L 41/5064* (2013.01); *H04L 67/10* (2013.01)

(58) Field of Classification Search
CPC ......... H04L 63/08; H04L 41/02; H04L 67/10; H04L 41/5064; H04L 63/0435
USPC ............. 726/4, 6, 9, 12; 713/1.167, 168, 169; 709/238, 223, 224, 248, 203, 208
See application file for complete search history.

(56) References Cited

U.S. PATENT DOCUMENTS

| 2006/0080468 | A1* | 4/2006 | Vadlamani et al. ........... 709/250 |
| 2011/0099558 | A1* | 4/2011 | Patrick et al. ................. 719/315 |
| 2013/0007845 | A1 | 1/2013 | Chang et al. |
| 2013/0346558 | A1 | 12/2013 | Khalidi et al. |
| 2014/0053280 | A1 | 2/2014 | Durazzo et al. |

* cited by examiner

*Primary Examiner* — Brandon Hoffman
*Assistant Examiner* — Nega Woldemariam
(74) *Attorney, Agent, or Firm* — Fish & Richardson P.C.

(57) ABSTRACT

A data exchange adaptor that synchronizes data between an enterprise system operated by a company and a cloud-based system operated by a third party other than the company. The data exchange adaptor enables exchange of data between the enterprise system and the cloud-based system and controls storage and retrieval of data at the enterprise system and the cloud-based system. The data exchange adaptor also performs transport level security for communications that exchange data between the enterprise system and the cloud-based system and access level security for data stored to the enterprise system and the cloud-based system. The data exchange adaptor further schedules synchronization of data between the enterprise system and the cloud-based system and allows the enterprise system to retain control over the synchronization of data between the enterprise system and the cloud-based system.

19 Claims, 20 Drawing Sheets

DATA EXCHANGE TECHNOLOGY

CROSS-REFERENCE TO RELATED APPLICATION(S)

The present application claims the benefit of Indian Patent Application No. 3012/CHE/2011, filed on Sep. 2, 2011, which is incorporated herein by reference in its entirety for all purposes.

FIELD

This disclosure relates to data exchange technology.

BACKGROUND

A company may use a customer relationship management (CRM) system to implement a strategy for managing the company's interactions with customers and sales prospects. The customer relationship management system may organize, automate, and synchronize business processes and handle sales related activities, marketing, customer service, and technical support.

Cloud computing is the use of computing resources (e.g., hardware and software) that are delivered as a service over a network (typically the Internet). Cloud computing entrusts remote services with a user's data, software, and computation.

SUMMARY

In one aspect, a data exchange adaptor synchronizes data between an enterprise system operated by a company and a cloud-based system operated by a third party other than the company. The data exchange adaptor includes at least one communication module configured to exchange data between the enterprise system operated by the company and the cloud-based system operated by the third party. The data exchange adaptor also includes at least one data controller configured to extract data from the at least one communication module and control storage and retrieval of data at the enterprise system and the cloud-based system. The data exchange adaptor further includes at least one authentication module configured to perform transport level security for communications that exchange data between the enterprise system and the cloud-based system and access level security for data stored to the enterprise system and the cloud-based system. In addition, the data exchange adaptor includes a job scheduler that is operated by the enterprise system and that is configured to control the at least one communication module, the at least one data controller, and the at least one authentication module to schedule synchronization of data between the enterprise system and the cloud-based system and allow the enterprise system to retain control over the synchronization of data between the enterprise system and the cloud-based system.

Implementations may include one or more of the following features. For example, the at least one communication module may be configured to exchange calendar data between the enterprise system operated by the company and the cloud-based system operated by the third party and the at least one data controller may be configured to extract calendar data from the at least one communication module and control storage and retrieval of calendar data at the enterprise system and the cloud-based system. In this example, the job scheduler may be configured to schedule synchronization of calendar data between the enterprise system and the cloud-based system such that a calendar maintained by the enterprise system is synchronized with a calendar maintained by the cloud-based system.

In some implementations, the at least one communication module may be configured to exchange contact data between the enterprise system operated by the company and the cloud-based system operated by the third party and the at least one data controller may be configured to extract contact data from the at least one communication module and control storage and retrieval of contact data at the enterprise system and the cloud-based system. In these implementations, the job scheduler may be configured to schedule synchronization of contact data between the enterprise system and the cloud-based system such that contacts maintained by the enterprise system are synchronized with contacts maintained by the cloud-based system.

In some examples, the at least one communication module may be configured to exchange task data between the enterprise system operated by the company and the cloud-based system operated by the third party and the at least one data controller may be configured to extract task data from the at least one communication module and control storage and retrieval of task data at the enterprise system and the cloud-based system. In these implementations, the job scheduler may be configured to schedule synchronization of task data between the enterprise system and the cloud-based system such that tasks maintained by the enterprise system are synchronized with tasks maintained by the cloud-based system.

The enterprise system may be a customer relationship management (CRM) system, the at least one communication module may be configured to exchange data between the CRM system operated by the company and the cloud-based system operated by the third party, and the at least one data controller may be configured to control storage and retrieval of data at the CRM system and the cloud-based system. In addition, the at least one authentication module may be configured to perform transport level security for communications that exchange data between the CRM system and the cloud-based system and access level security for data stored to the CRM system and the cloud-based system and the job scheduler may be operated by the CRM system and is configured to schedule synchronization of data between the CRM system and the cloud-based system and allow the CRM system to retain control over the synchronization of data between the CRM system and the cloud-based system. The job scheduler may be configured to trigger reverse synchronization from the cloud-based system to the CRM system.

In some implementations, the at least one communication module may include at least one web service module configured to exchange web-based requests and responses between the enterprise system operated by the company and the cloud-based system operated by the third party. In these implementations, the at least one web service module may include a first web service operated on the enterprise system and a second web service operated on the cloud-based system, where the first web service operated on the enterprise system and the second web service operated on the cloud-based system are configured to exchange web-based requests and responses with each other. Further, in these implementations, the first web service operated on the enterprise system may be a consumer web service operated on the enterprise system, the second web service operated on the cloud-based system may be a producer web service operated on the cloud-based system, and the producer web service operated on the cloud-based system may always be triggered by the consumer web service operated on the enterprise system.

Further, the job scheduler may be configured to periodically initiate a synchronization process after a particular period of time has passed since a most recent synchronization process. The job scheduler may be configured to initiate a synchronization process based on user input received to perform synchronization. The job scheduler may be configured to initiate a synchronization process based on a change to data maintained by the enterprise system.

In some examples, the at least one data controller may include a first data controller operated on the enterprise system and configured to control storage and retrieval of data at the enterprise system and a second data controller operated on the cloud-based system and configured to control storage and retrieval of data at the cloud-based system. In these examples, the first data controller may include a web-based user interface configured to enable selection and deselection of synchronization options and manual triggering of synchronization, a data injector configured to update data received from the cloud-based system to the enterprise system, a data extractor configured to extract data from the enterprise system and forward the extracted data to the cloud-based system for synchronization, an exception handler configured to check on a variety of exceptions and errors received while synchronization is in process, and a logging component configured to log events on a periodic basis. In addition, in these examples, the second data controller may include a service manager which provides controller service to access various services in the cloud-based system, a data injector configured to update data received from the enterprise system to the cloud-based system, a data extractor configured to extract data from the cloud-based system and forward the extracted data to the enterprise system for synchronization, an exception handler configured to check on a variety of exceptions and errors received while synchronization is in process, and a logging component configured to log events on a periodic basis.

The at least one authentication module may be configured to use a two-legged authentication mechanism to perform create, read, update, and delete operations in the cloud-based system. Also, the at least one authentication module may be configured to determine whether a consumer key and a secret for a domain are present for a requested operation, based on a determination that a consumer key or a secret for the domain are absent for the requested operation, decline the requested operation and provide an indication that no update operation will be performed, based on a determination that a consumer key and a secret for the domain are present for the requested operation, use a two-legged authentication process to authorize the consumer key and the secret for the domain, and, based on authorizing the consumer key and the secret for the domain, make a subsequent request to perform the requested operation.

In some implementations, the at least one communication module may include a first web service operated on the enterprise system and a second web service operated on the cloud-based system and the at least one authentication module may include a first encryption mechanism operated on the enterprise system and a second encryption mechanism operated on the cloud-based system. In these implementations, the at least one data controller may include a cloud data controller operated on the cloud-based system and the first web service may be configured to access data stored by the enterprise system, initiate the first encryption mechanism, and provide a request/response object to the first encryption mechanism. Further, in these implementations, the first encryption mechanism may be configured to encrypt a system provided key, add the system provided key to the request/response object, and provide an updated version of the request/response object to the first web service. Also, in these implementations, the first web service may be configured to send the updated version of the request/response object to the second web service and the second web service may be configured to receive the updated version of the request/response object and provide the updated version of the request/response object to the second encryption mechanism. In addition, in these implementations, the second encryption mechanism may be configured to segregate the encrypted key from the updated version of the request/response object, validate the segregated key against a reference key provided to the cloud-based system in advance, and forward the validated request/response object to the second web service for further processing, the second web service may be configured to forward the validated request/response object to the cloud data controller, and the cloud data controller may be configured to perform a data synchronization operation based on the validated request/response object.

In another aspect, at least one computer-readable storage medium is encoded with executable instructions that, when executed by at least one processor, cause the at least one processor to perform operations. The operations include exchanging data between an enterprise system operated by a company and a cloud-based system operated by a third party other than the company and controlling storage and retrieval of data at the enterprise system and the cloud-based system. The operations also include performing transport level security for communications that exchange data between the enterprise system and the cloud-based system and access level security for data stored to the enterprise system and the cloud-based system. The operations further include scheduling synchronization of data between the enterprise system and the cloud-based system in a manner that allows the enterprise system to retain control over the synchronization of data between the enterprise system and the cloud-based system.

In yet another aspect, a method includes using at least one communication module to exchange data between an enterprise system operated by a company and a cloud-based system operated by a third party other than the company and using at least one data controller to extract data from the at least one communication module and control storage and retrieval of data at the enterprise system and the cloud-based system. The method also includes using at least one authentication module to perform transport level security for communications that exchange data between the enterprise system and the cloud-based system and access level security for data stored to the enterprise system and the cloud-based system. The method further includes using a job scheduler that is operated by the enterprise system to schedule synchronization of data between the enterprise system and the cloud-based system and allow the enterprise system to retain control over the synchronization of data between the enterprise system and the cloud-based system.

The details of one or more implementations are set forth in the accompanying drawings and the description, below. Other potential features of the disclosure will be apparent from the description and drawings, and from the claims.

BRIEF DESCRIPTION OF THE DRAWINGS

FIGS. 10-20 are example screenshots of example interfaces for a data exchange adaptor.

DETAILED DESCRIPTION

In one aspect, a data exchange adaptor synchronizes data between an enterprise system operated by a company and a cloud-based system operated by a third party other than the company. The data exchange adaptor may include at least one communication module configured to exchange data between the enterprise system operated by the company and the cloud-based system operated by the third party, and at least one data controller configured to extract data from the at least one communication module and control storage and retrieval of data at the enterprise system and the cloud-based system. The data exchange adaptor also may include at least one authentication module configured to perform transport level security for communications that exchange data between the enterprise system and the cloud-based system and access level security for data stored to the enterprise system and the cloud-based system. The data exchange adaptor further may include a job scheduler that is operated by the enterprise system and that is configured to control the at least one communication module, the at least one data controller, and the at least one authentication module to schedule synchronization of data between the enterprise system and the cloud-based system and allow the enterprise system to retain control over the synchronization of data between the enterprise system and the cloud-based system.

In some implementations, an adaptor tool exchanges data between two completely different systems: a customer relationship management system (e.g., SAP-CRM) and a cloud-based system (e.g., Google Apps). The adaptor provides a mechanism for users to synchronize their data from the CRM system to the cloud-based system. The communication mechanism provided by the adaptor, between these systems, is bi-directional. It includes Java Enterprise and ABAP based components including Web Services. The interaction between the systems happens via Producer and Consumer Web Services hosted in both systems. The following are the different modules of the adaptor: Web Service Module, Data Controller Module, Authentication Module, Security Module, and Job Scheduler The adaptor tool components may be orchestrated in such a fashion that makes it a custom fit solution for most of the data exchange requirements in any CRM (e.g., SAP-CRM) implementation to a cloud-based system (e.g., Google Apps). In some examples, the adaptor framework, as mentioned above, includes five modules which work seamlessly with each other and provide the following three principal functionalities: Contact Synchronization, Appointment Synchronization, and Tasks Synchronization.

Figure 1:
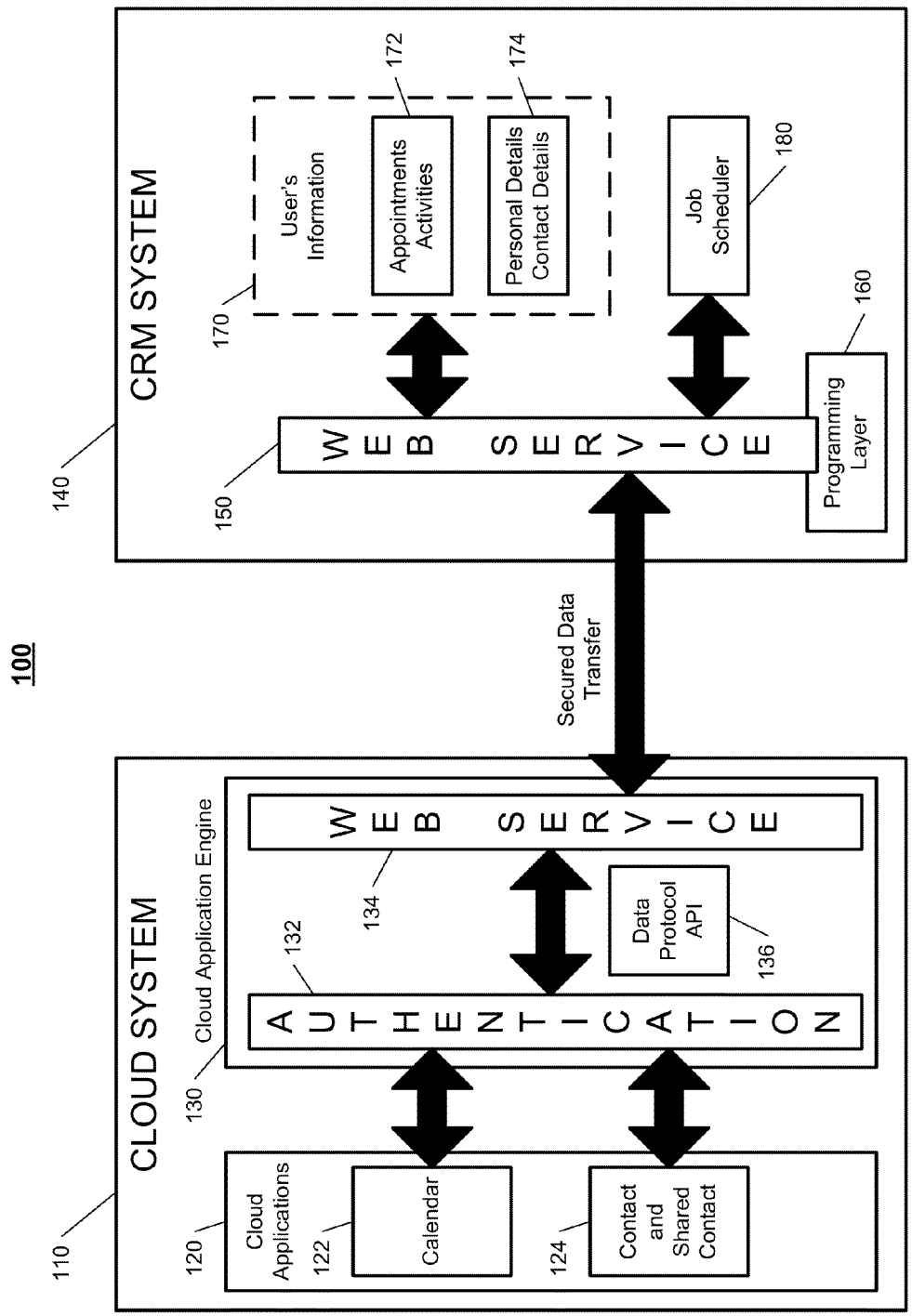
FIG. 1 is a diagram of an example system for performing data exchange.

FIG. 1 illustrates an example system 100 for performing data exchange. As shown, the system 100 has a framework and a set of components for an implementation that involves a CRM system 140 (e.g., an SAP-CRM system) and a cloud system 110 (e.g., Google Apps).

The cloud system 110 includes cloud applications 120 and a cloud application engine 130. The cloud applications 120 are applications offered by the cloud service provider that operates the cloud system 110. The cloud applications 120 may include a calendar application 122, a contact application 124, and/or any other type of application offered by a cloud service provider.

The cloud application engine 130 includes an authentication module 132, a cloud web service 134 portion of a web service module, and a data protocol application programming interface (API). The authentication module 132 authenticates requests to retrieve from and/or store data to the cloud applications 120 and enables data operations with the cloud applications 120 when the authentication module 132 deems a request to be authentic. The authentication module 132 blocks data operations with the cloud applications 120 when the authentication module 132 deems a request to be unauthentic.

The cloud web service 134 exchanges communications with the CRM system 140. The cloud web service 134 also communicates with the authentication module 132 through the data protocol API 136. For instance, the data protocol API 136 converts communications from the cloud web service 134 to a format that the authentication module 132 understands and also converts communications from the authentication module 132 to a format that the cloud web service 134 understands.

The CRM system 140 is operated by a company that is different than the cloud service provider that operates the cloud system 110. The CRM system 140 includes a CRM web service 150 portion of a web service module, a programming layer 160, user information 170 stored by the CRM system 140, and a job scheduler 180. The CRM web service 150 exchanges communications with the cloud system 110 (e.g., the cloud web service 134). The CRM web service 150 also stores and retrieves data from the user information 170 and follows scheduling operations controlled by the job scheduler 180. The programming layer 160 provides a framework that the CRM web service 150 uses to interact with the user information 170 and the job scheduler 180.

The user information 170 may include appointment activities 172 maintained by the CRM system 140, personal and contact details 174 maintained by the CRM system 140, and/or any other type of data or service maintained by the CRM system 140. The job scheduler 180 controls scheduling of synchronization between the cloud system 110 and the CRM system 140. For example, the job scheduler 180 may periodically initiate a synchronization process after a particular period of time has passed since the last synchronization (e.g., initiate synchronization every ten minutes), initiate a synchronization process based on user input received to perform synchronization, and/or initiate a synchronization process based on a change to data maintained by the CRM system 140.

Using the system 100, the calendar data maintained by the cloud service provider through the calendar application 122 may be synchronized with the appointment activities 172 maintained by the different company operating the CRM system 140. Also, using the system 100, the contact data maintained by the cloud service provider through the contact application 124 may be synchronized with the personal and contact details 174 maintained by the different company operating the CRM system 140. By enabling synchronization of data maintained by the cloud system 110 with data maintained by the CRM system 140, the system 100 may enable employees of the company operating the CRM system 140 flexibility in whether the employees prefer to use the cloud system 110 or the CRM system 140 for performing operations (e.g., calendar operations, contact management, task management, etc.). Because the data is synchronized between the cloud system 110 and the CRM system 140, the company operating the CRM system 140 may be more comfortable that employees are using the cloud system 110, as all of the data collected by the cloud system 110 is ultimately stored at the CRM system 140, as well.

The Web service module made up of the cloud web service 134 and the CRM web service 150 is responsible for exchanging data between the CRM system 140 and the cloud system 110. The Web service module may be the backbone of the framework provided by the system 100 and may play an important role in swapping over data between the different systems.

In some implementations, the CRM system 140 and the cloud system 110 are coupled to consumer and producer web services, respectively, with each deployed on different platforms. Both web services may intelligently communicate with each other based on actions performed, such as manual triggers (e.g., user initiated, on-click event) or automated triggers produced by a pre-scheduled trigger mechanism. For instance, the cloud web service 134 may be a producer web service and the CRM web service 150 may be a consumer web service.

Figure 2:
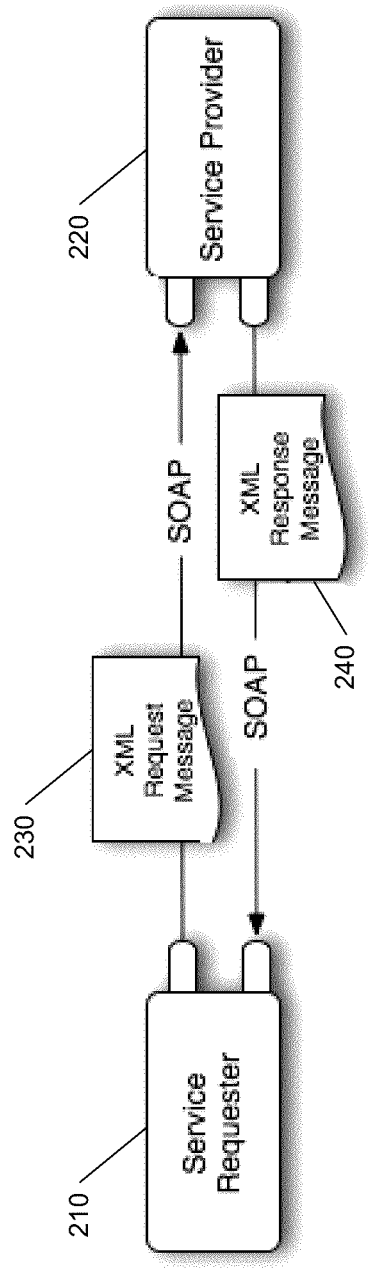
FIG. 2 is a diagram of example communication between two web-service components.

FIG. 2 illustrates example communication between two web-service components. For example, a producer web service may be deployed on a cloud application engine (e.g., Google Application Engine (GAE)). The cloud application engine may be a Platform-as-a-Service provided by the cloud service provider. In this example, the producer web service, at all times, is triggered from the CRM system. The producer web service also distinguishes the difference between the types of requests received, and performs the required functionality which involves receiving data from the CRM system and forwarding it to data controllers deployed at the cloud application engine and sharing the data from the cloud system and forwarding it to data controllers deployed at the CRM system.

The producer web service may be consumed through a client proxy generated in a workbench (e.g., an ABAP workbench) using a document (e.g., WSDL document) provided by web service. The producer web service sends the response back to the system in order to complete the synchronization request.

The consumer web service is hosted at the CRM system with the objective to provide better control of the adaptor on the client's side. The consumer web service triggers the producer web service and passes over the data to it in case of manual operations (e.g., a user initiated, on-click event). The consumer web service also connects to the producer web service whenever a job executes at a pre-scheduled time. In this case, the consumer web service plays the role of receiving the updated data from the cloud system and syncing it to the client system (e.g., the CRM system).

As shown in FIG. 2, a service requester 210 exchanges messages with a service provider 220. The service requester 210 may be a consumer web service hosted at a CRM system. The service provider 220 may be a producer web service deployed on a cloud application engine by a cloud service provider. The service requester 210 sends a request extensible markup language (XML) message 230 to the service provider 220 using the simple object access protocol (SOAP). The service provider 220 receives the request XML message 230, performs the data operations requested by the request XML message 230, and sends a response XML message 240 to the service requester 210 using SOAP. The service requester 210 receives the response XML message 240 and uses the response XML message 240 to confirm that all synchronization operations have been completed or determine the data operations needed at the service requester 210 to complete synchronization.

In some implementations, data controllers are responsible for extracting data from the web services. In these implementations, the data controllers also are responsible for providing the data back to the web services. The system may use two data controller components: a first data controller that interacts with the client system (e.g., the CRM system) and a second data controller that interacts with the cloud system.

The first data controller may be an ABAP Data Controller for interaction with an SAP-CRM system. The data synchronization between the CRM system and the cloud system may occur in two phases. The first phase is data transfer from the CRM system to the cloud system, triggered by manual user input. In the first phase, data is retrieved from the CRM system and passed to the client proxy class bound with the web service. The data sent is processed by the web service for sending it across to the producer web service.

The second phase is the transfer of data from the cloud system to the CRM system, triggered through a set of scheduled jobs. A periodic job scheduler runs the client proxies which in turn request data from the web service. The producer web service transmits recently updated/modified data as a SOAP response. The data received is parsed, processed and updated in the CRM system. The following sections depict these phases in more detail.

Figure 3:
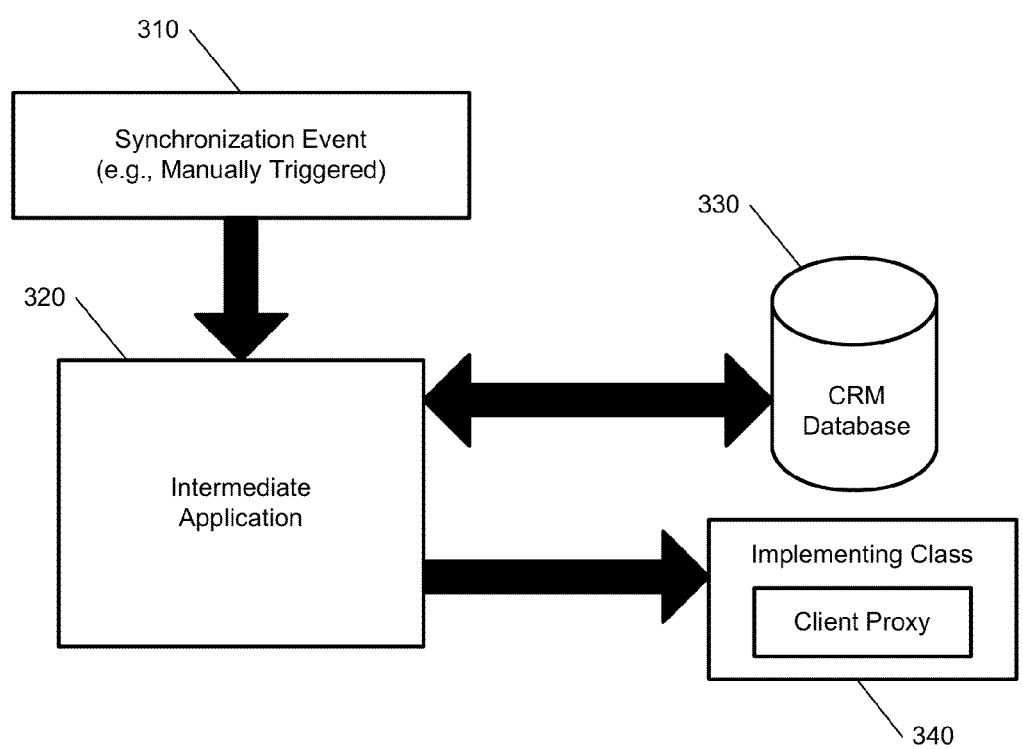
FIG. 3 is a diagram of an example of data synchronization from a CRM system to a cloud system.

FIG. 3 illustrates an example of data synchronization from a CRM system to a cloud system. As shown, FIG. 3 depicts the sequence of action that takes place when a synchronize event is triggered (e.g., manually triggered) from the CRM system. When the event is triggered 310, an intermediate application 320 fetches the data from the client's CRM database 330 and passes on the fetched data to the client proxy 340.

Figure 4:
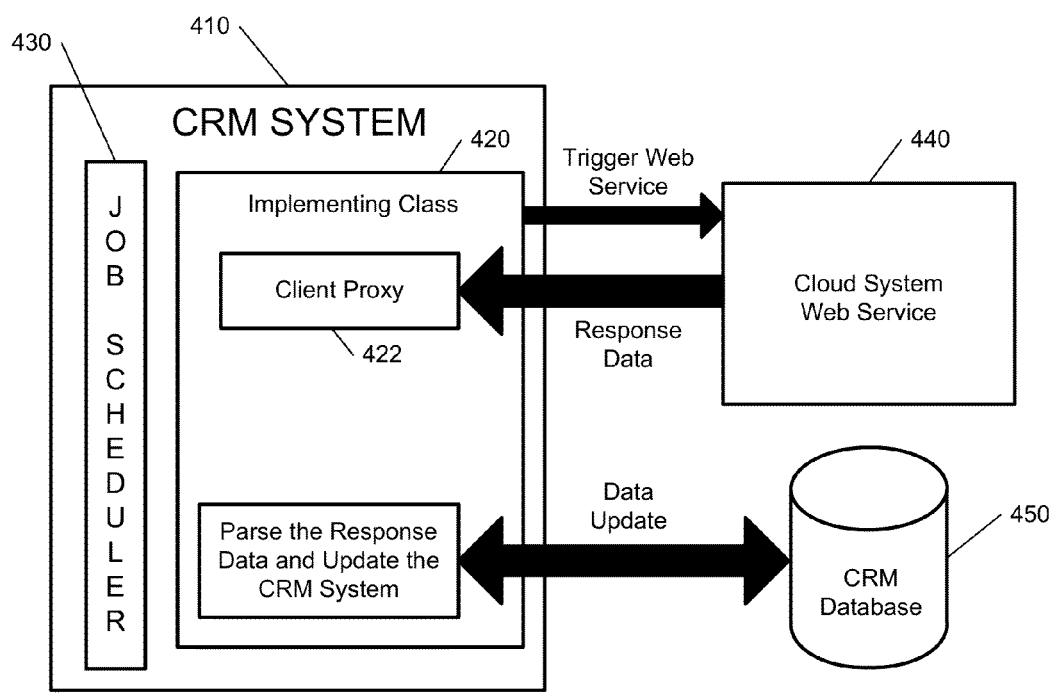
FIG. 4 is a diagram of an example of data synchronization from a cloud system to a CRM system.

FIG. 4 illustrates an example of data synchronization from a cloud system to a CRM system 410. As shown, FIG. 4 depicts the sequence of action that takes place when the job scheduler 430 triggers a web service 420 in the CRM system 410. The cloud web service 440 fetches the data which is further passed as the response of the called web service. The client proxy 422 residing in the CRM system 410 receives the response, parses the response data, and updates the CRM database 450 with the parsed response data.

Figure 5:
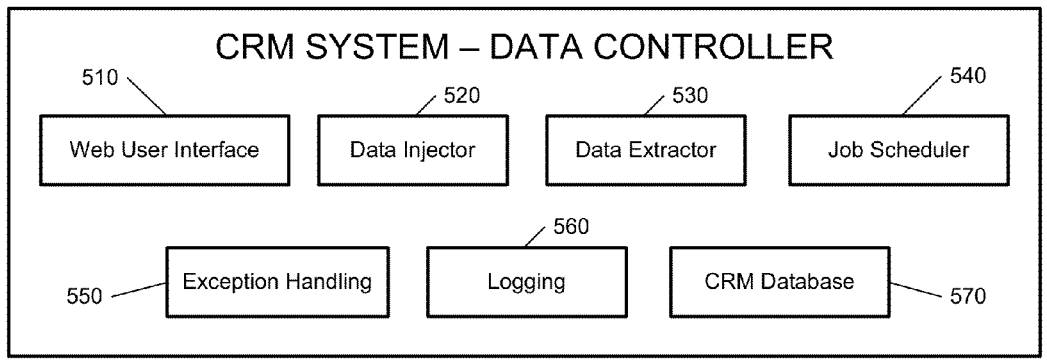
FIG. 5 is a diagram of an example of a data controller that interacts with a CRM system.

FIG. 5 illustrates an example of a data controller 500 that interacts with a CRM system. The data controller 500 includes a web user interface 510, a data injector 520, a data extractor 530, a job scheduler 540, an exception handler 550, a logging component 560, and a CRM database 570. The web user interface 510 is a web-based user interface for administration activities like selecting/deselecting the synchronization option and manual triggering the synchronization.

The data injector 520 updates the data received from the cloud system to the CRM system. The data extractor 530 extracts the data from the client system and forwards the extracted data to the cloud system for synchronization. The job scheduler 540 schedules synchronization processes to periodically occur in accordance with a user-defined time period.

The exception handler 550 is an exception handling mechanism that keeps a check on a variety of exceptions and errors received while the synchronization is in process. The exceptions and errors may include web-service faults, user-entered faults, data transfer exceptions, and system specific exceptions.

The logging component 560 logs events on a periodic (e.g., daily) basis. Logging occurs when any exception is captured during the synchronization process. The detailed logs may provide enough information to capture any difference in the process.

The CRM database 570 is the client database where all the information is stored. The data stored in the CRM database 570 is the information used to synchronize with the cloud system.

Figure 6:
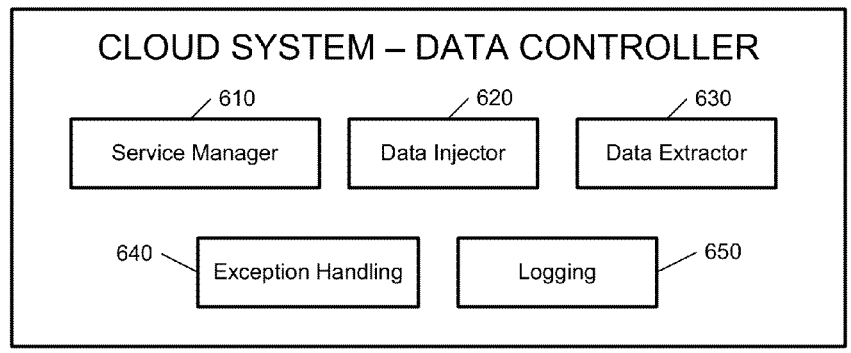
FIG. 6 is a diagram of an example of a data controller that interacts with a cloud system.

FIG. 6 illustrates an example of a data controller 600 that interacts with a cloud system. The request received from the client system is forwarded to the data controller 600 via the producer web service. In return, based on the request type, the data controller 600 performs the corresponding action.

When the request is to synchronize data from the CRM system to the cloud system, the data controller 600 extracts the data, passed from the CRM system through the producer web service, and synchronizes the extracted data to the cloud system. For the request to synchronize data to the CRM system, the data controller 600 fetches the data from the cloud system and passes it to the producer web service. The data is added as a response that the producer web service passes on to the consumer web service.

The data controller 600 includes a service manager 610, a data injector 620, a data extractor 630, an exception handler 640, and a logging component 650. The service manager 610 is a service object which provides controller service to access the various services in the cloud system (e.g., calendar/contact details).

The data injector 620 updates the data received from the client system to the cloud system. The data extractor 630 extracts the data from the cloud system and forwards the extracted data to the client system for synchronization.

The exception handler 640 is an exception handling mechanism that keeps a check on a variety of exceptions and errors received while the synchronization is in process. The exceptions and errors may include web-service faults, user-entered faults, data transfer exceptions and cloud system specific exceptions.

The logging component 650 logs events on a periodic (e.g., daily) basis. Logging occurs when any exception is captured during the synchronization process. The detailed logs may provide enough information to capture any difference in the process. The logging may be maintained at the client system, even for updates that occur on the third party cloud-based system.

Figure 7:
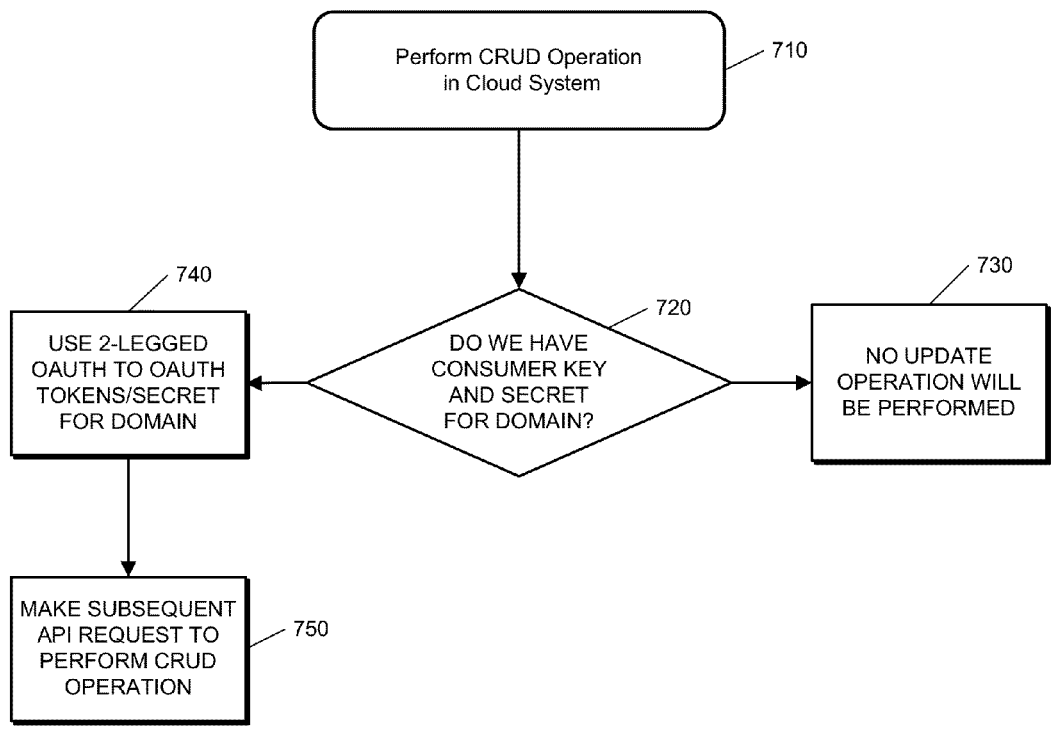
FIG. 7 is a flow chart of an example authentication process.

FIG. 7 illustrates an example authentication process 700. The cloud system performs Create, Read, Update and Delete (CRUD) operations (710). All of the CRUD operations performed within the cloud system are authenticated via an authentication module. Each request to synchronize data has to pass through the authentication module to perform any synchronization operations. The adaptor uses a two-legged authentication mechanism to perform CRUD operations in the cloud system. Implementing two-legged authentication provides seamless user experience as no human interference is required during the entire authentication process.

The adaptor keeps a check on any unauthenticated data access/update requests. The data synchronization will fail to perform if authentication fails at any level.

For example, the adaptor determines whether a consumer key and a secret for the domain are present for a requested operation (720). Based on a determination that a consumer key and/or a secret for the domain are absent for a requested operation, the adaptor declines the request and provides an indication that no update operation will be performed (730).

Based on a determination that a consumer key and a secret for the domain are present for a requested operation, the adaptor uses a two-legged authentication process to authorize the consumer key and the secret for the domain (740). Based on authorizing the consumer key and the secret for the domain, the adaptor makes a subsequent request (e.g., API request) to perform the CRUD operation requested (750).

In some examples, a security component performs security for the web services. In these examples, the security component is responsible to ensure security in the web services. The security component may handle security at two levels: transport-level security and access-level security.

In performing transport-level security, the security component may be responsible for configuring the logic to secure the connection between the web services with Secure Sockets Layer (SSL). The logic may be configured in such a way that whenever the web service is initiated from the CRM system using "http://" it will be redirected to a secure connection "https://". This mechanism helps ensure secure connection by allowing two web services to authenticate each other's identity. The data is then exchanged in an encrypted format between them.

Figure 8:
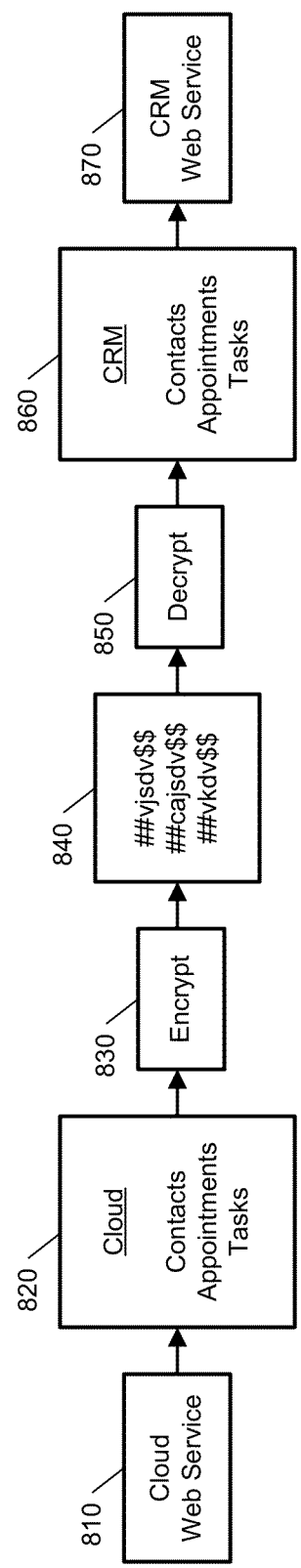
FIG. 8 is a diagram of an example of transport-level security.

FIG. 8 illustrates an example of transport-level security. As shown, a cloud web service 810 extracts cloud system data 820 (e.g., contacts, appointments, tasks, etc.) and encrypts 830 the cloud system data 820 prior to transport. The encrypted data 840 is transported to the CRM system. The CRM system decrypts 850 the encrypted data 840 and generates CRM system data 860 (e.g., contacts, appointments, tasks, etc.). The CRM web service 870 accesses the CRM system data 860 and uses the CRM system data 860 to synchronize the CRM database.

In performing access-level security, the security component may be implemented at both ends: the CRM system and the cloud system. The security component encrypts the key which is passed along with the data sent over the web service. The component on the receiving end validates the encrypted key to ensure authorized access.

Figure 9:
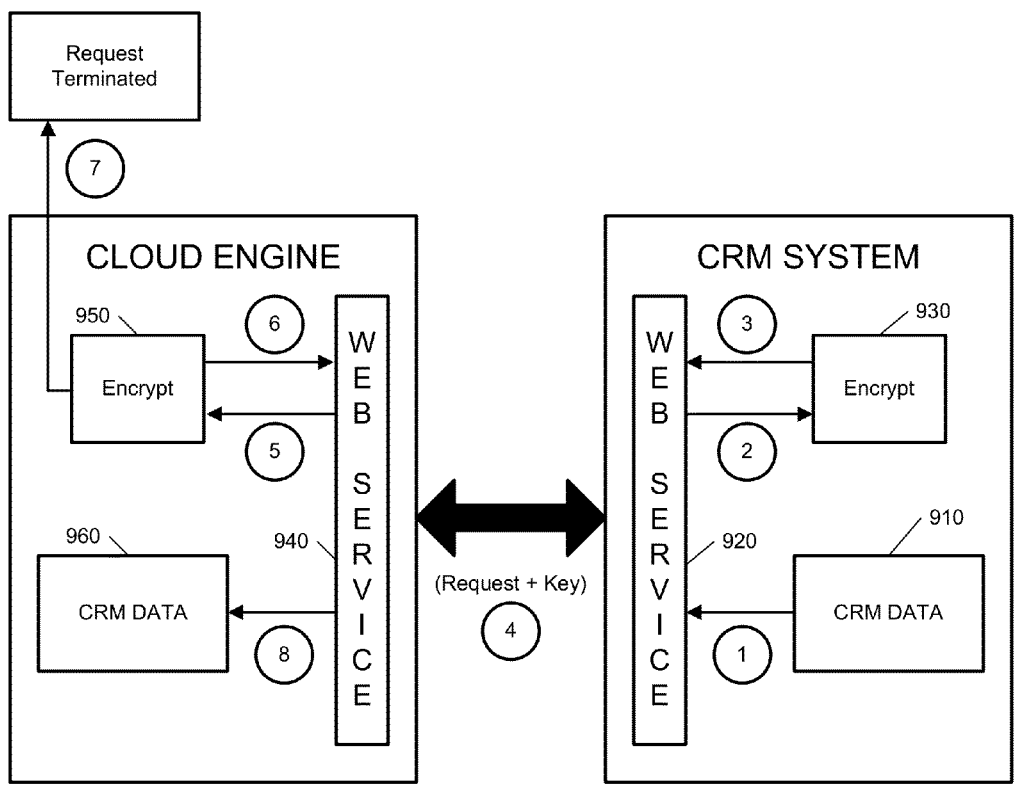
FIG. 9 is a diagram of an example of access-level security.

FIG. 9 illustrates an example of access-level security. As shown, in the first operation, CRM data 910 is passed to the web service 920. In the second operation, an encryption mechanism 930 is initiated from within the web service 920. In the third operation, a system provided key is encrypted and added to the request/response object coming from the web service 920. In the fourth operation, the request along with the encrypted key is passed on to the web service 940 hosted in the cloud system. In the fifth operation, the request is passed to an encryption mechanism 950, where the encrypted key is segregated from the request (coming from the CRM system) and validated against the key provided to the cloud system in advance. If the encryption mechanism 950 determines that the keys match, then, as the sixth operation, the request is validated and forwarded for further processing. If the encryption mechanism 950 determines that the keys do not match, the request is terminated indicating an unauthorized access, as the seventh operation. In the eighth operation, the validated request is forwarded to the cloud data controller 960.

In some examples, a job scheduler is used to schedule synchronization processes. In these examples, the main purpose of the job scheduler is to trigger reverse synchronization from the cloud system to the CRM system.

The job scheduler offers control of the adaptor on the client system. The jobs scheduled at predefined times trigger the consumer web service, which in turn requests the producer web service to get the data from the cloud system. In this regard, the client system retains control over the synchronization processes.

With increasing usage of cloud computing across different industries like telecommunications, information technology, manufacturing, automobile, retail, etc., the adaptor framework described throughout this disclosure may offer a valuable service. These industries may use CRM (e.g., SAP-CRM) implementations and in one way or another may target to utilize the cloud technology to reap its benefits. As described above, one such feature of its utilization may be co-existence of a CRM system (e.g., an SAP-CRM system) along with a cloud system (e.g., Google Apps).

A customer may receive several benefits from using one or more of the example data exchange connectors described throughout this disclosures. For instance, the data exchange adaptor may be employed as an easy plug-n-play tool. With minimum deployment hassles and configuration settings, the adaptor may be ready to provide synchronization for clients.

The data exchange adaptor also may provide secured data transfer. With message level and transport level security in place, the data synchronization may be highly secured.

The data exchange adaptor further may be deployed with reduced infrastructure cost. Minimal (or no) additional infrastructure cost may be incurred as the tool may only utilize existing systems. This, in turn, also may result in reduced time to market In addition, the data exchange adaptor may be deployed with near zero maintenance cost. For example, one part of the adaptor may use the existing system, which may result in zero maintenance increase. And, with cloud computing as the foundation framework for the adaptor tool, the maintenance required may reduce considerably.

With cloud computing as its base structure, the data exchange adaptor may experience any one or more of all the cloud computing benefits. For instance, the data exchange adaptor may experience no licensing issues, less maintenance, hassle-free software updates, and/or high scalability based on load.

FIGS. 10-20 illustrate example screenshots for a data exchange adaptor. The screenshots may be used for an example data exchange adaptor that synchronizes data between a CRM system (e.g., an SAP-CRM system) and a cloud system (e.g., Google Apps). Other types of client-operated enterprise systems may be synchronized with other types of third-party operated cloud-based systems using similar screenshots and similar techniques to those described throughout this disclosure.

Figure 10:
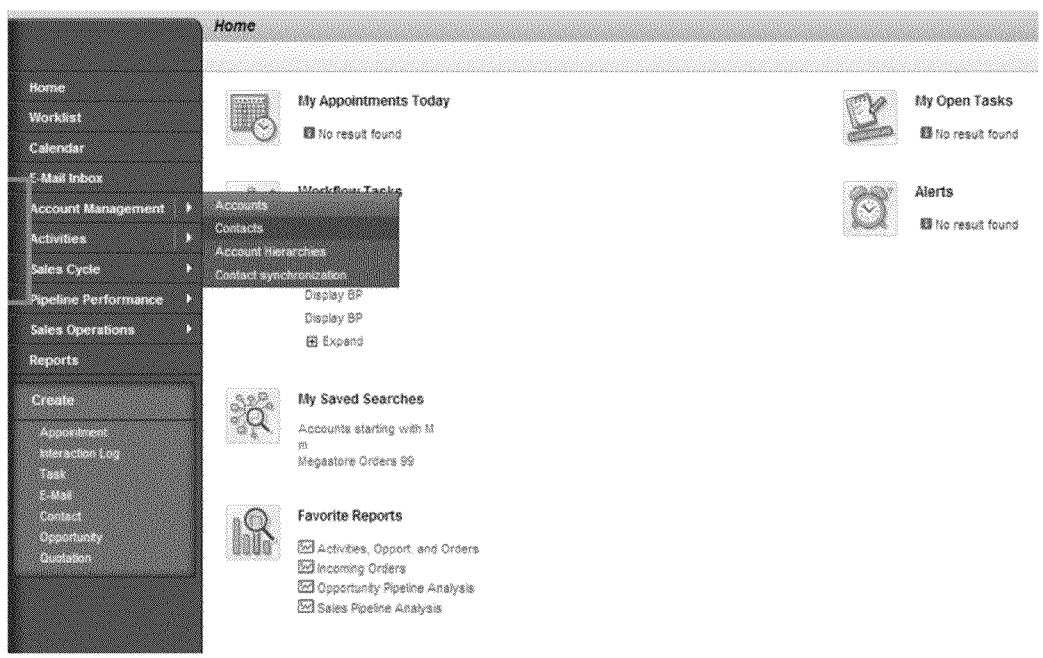

FIG. 10 illustrates an example interface 1000. The interface 1000 enables contact synchronization between a CRM system and a cloud system. As shown, the interface 1000 enables a user to navigate to an "Account Management—Contacts" option from a navigation bar to create a contact.

Figure 11:
Figure 12:
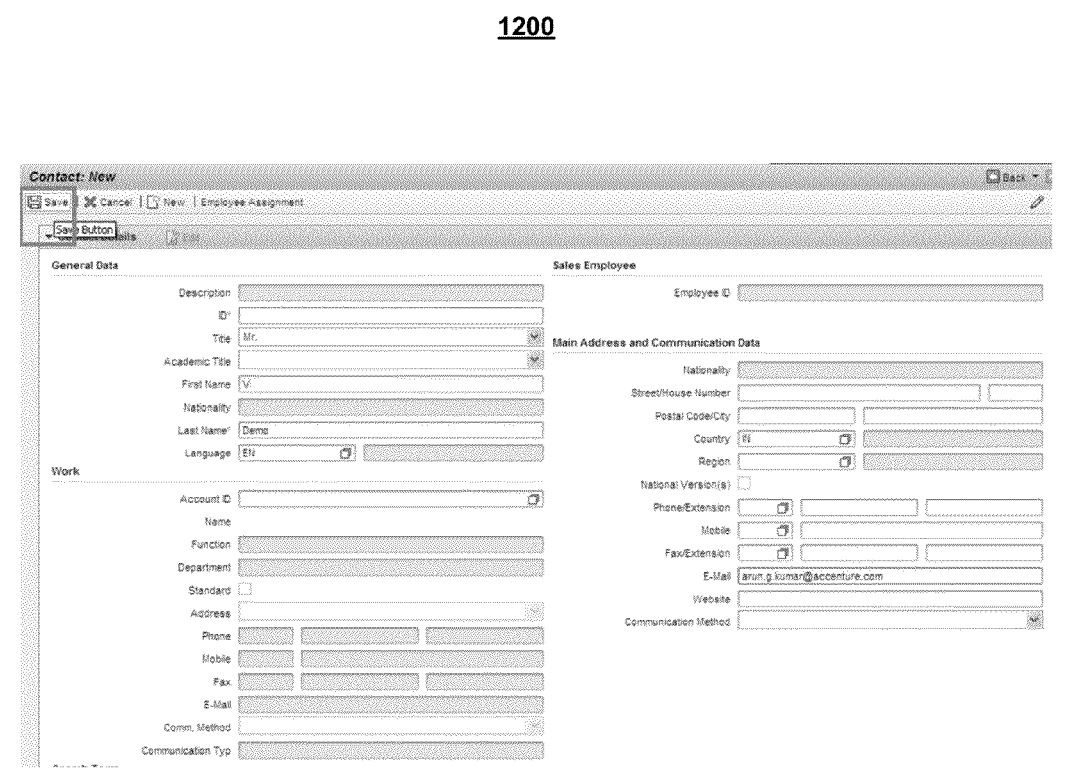

FIG. 11 illustrates an example interface 1100 displayed in response to selection of the "Account Management—Contacts" option from the navigation bar included in the interface 1000. The interface 1100 includes a variety of input fields that receive user input to define contact information for a new contact. After information for the new contact has been received in the input fields of the interface 1100, the new contact is saved to the CRM system, as shown in an example interface 1200 illustrated in FIG. 12.

Figure 13:
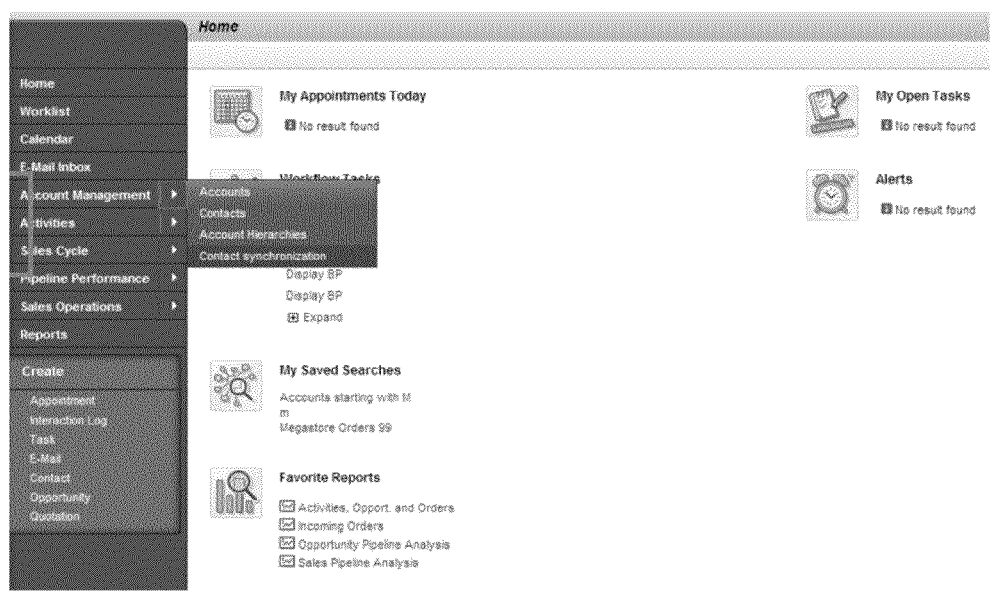

FIG. 13 illustrates an example interface 1300. The interface 1300 enables contact synchronization between a CRM system and a cloud system. As shown, the interface 1300 enables a user to navigate to an "Account Management—Contact Synchronization" option from a navigation bar.

Figure 14:
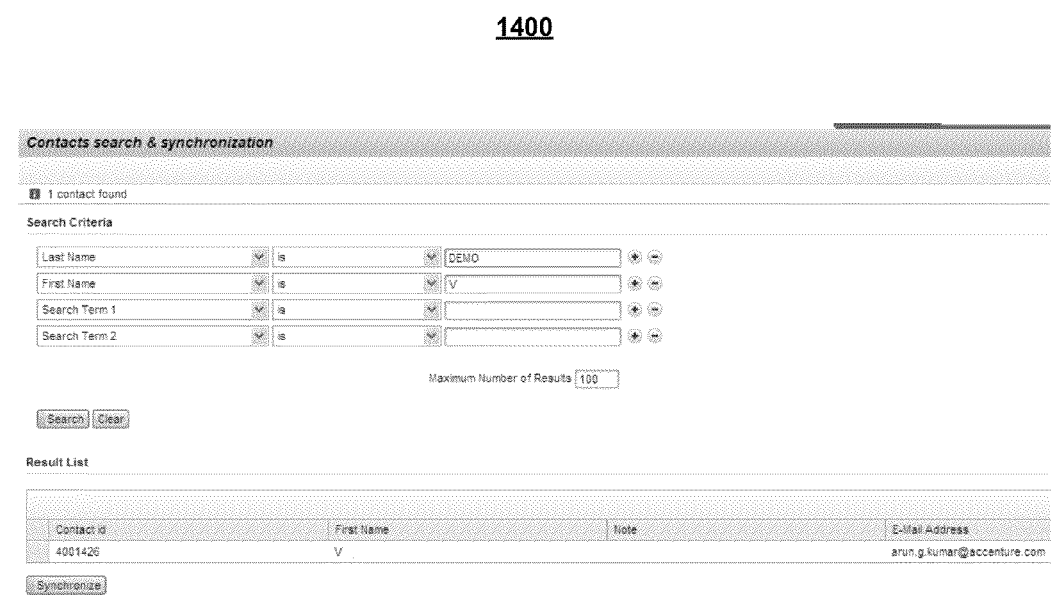

FIG. 14 illustrates an example interface 1400 displayed in response to selection of the "Account Management—Contact Synchronization" option from the navigation bar included in the interface 1300. The interface 1400 includes a variety of input fields that receive user input to define search criteria. After search criteria has been received in the input fields of the interface 1400 and the search button has been selected, the CRM system performs a search based on the search criteria.

Results of the search are displayed in a result list portion of the interface 1400. To synchronize one or more contacts from the CRM system to the cloud system, a user selects the one or more contacts from the search result list and clicks the synchronize button. Based on selection of the synchronize button, selected contact details are updated to the cloud system and the synchronization status is displayed.

Figure 15:
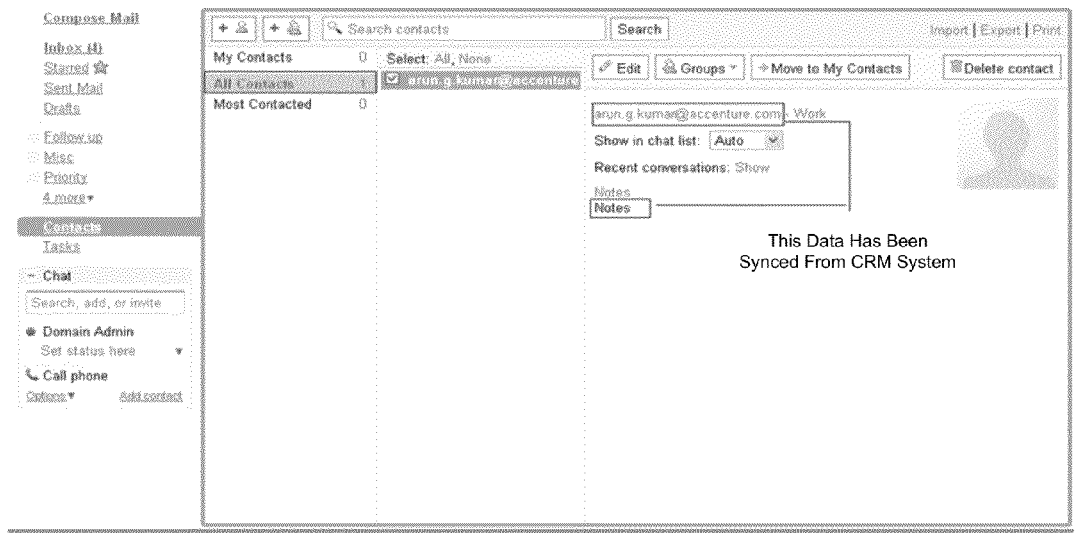

FIG. 15 illustrates an example interface 1500 from the cloud system after synchronization has occurred. The interface 1500 is displayed after a user has logged into the cloud system and navigated to a contacts area. As shown, the interface 1500 displays the contact from the CRM system and indicates that the data for the contact has been synchronized from the CRM system.

Figure 16:
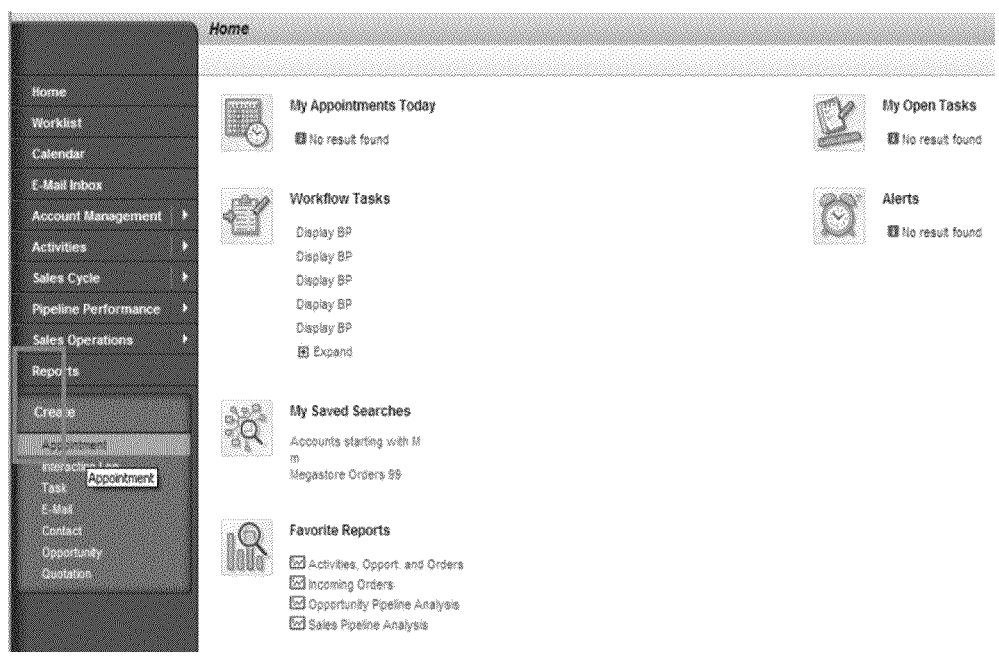

FIG. 16 illustrates an example interface 1600. The interface 1600 enables appointment synchronization between a CRM system and a cloud system. As shown, the interface 1600 enables a user to navigate to a "Create—Appointment" option using a direct link from a navigation bar.

Figure 17:
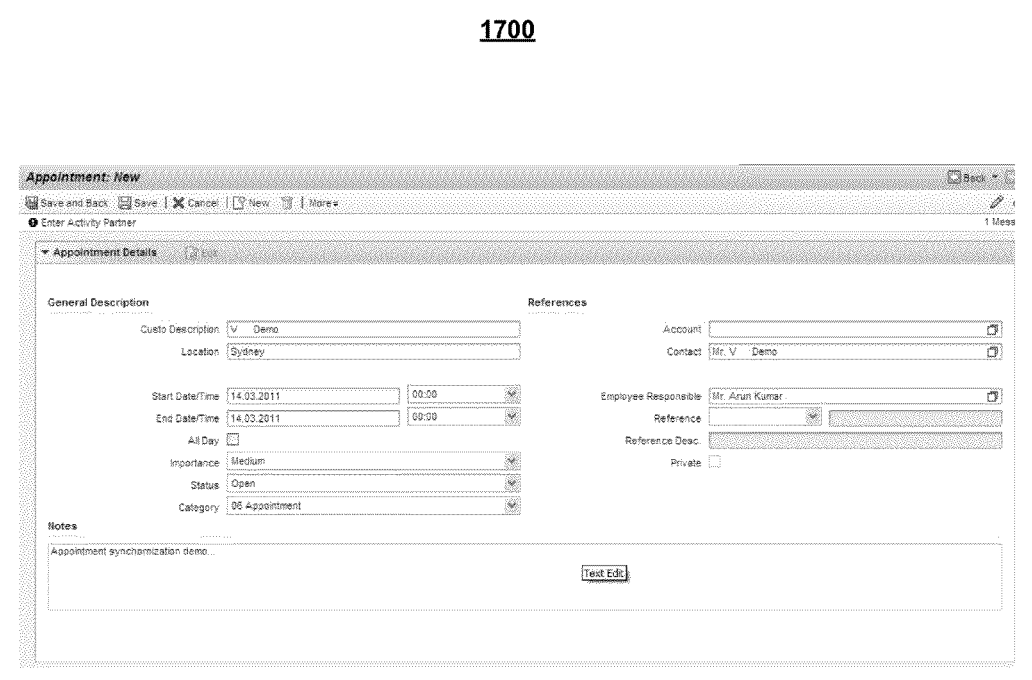

FIG. 17 illustrates an example interface 1700 displayed in response to selection of the "Create—Appointment" option from the navigation bar included in the interface 1600. The interface 1700 includes a variety of input fields that receive user input to define appointment information for a new appointment. After information for the new appointment has been received in the input fields of the interface 1700, the new appointment is saved to the CRM system in response to selection of a save input button. Once the appointment is saved, an appointment invite is sent to the contact person defined in the appointment.

Figure 18:
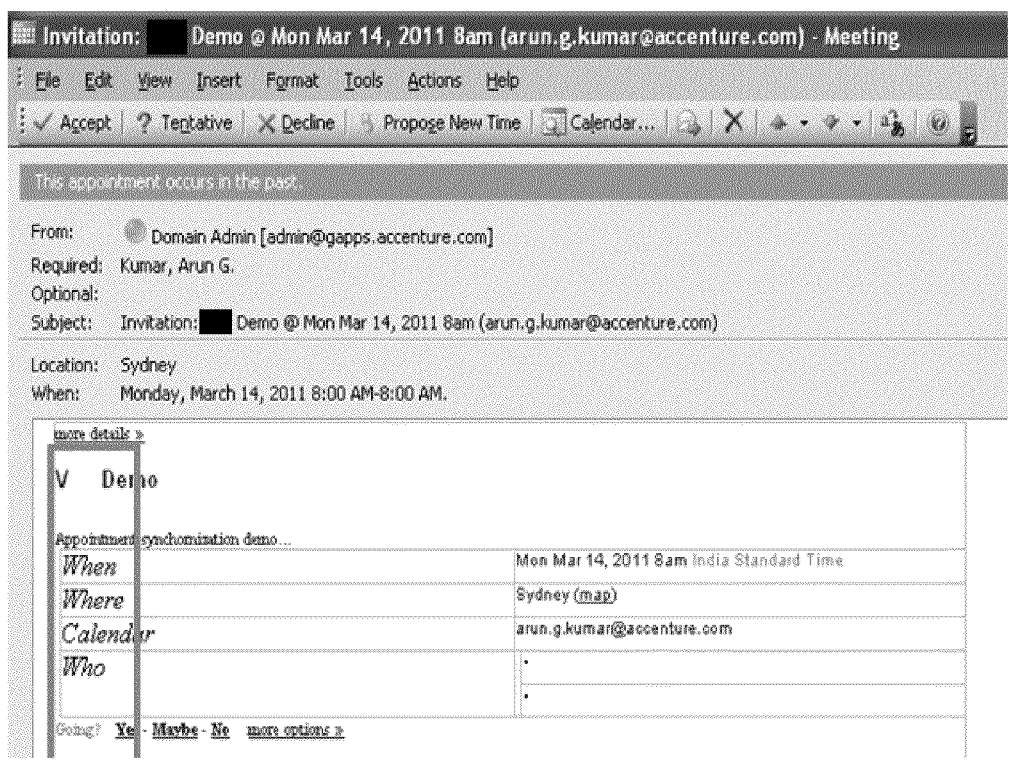

FIG. 18 illustrates an example interface 1800 of an invite sent based on the appointment created using the interface 1700. The invite shown in the interface 1800 is an electronic mail message sent to an electronic mail address for the contact person defined in the appointment.

Figure 19:
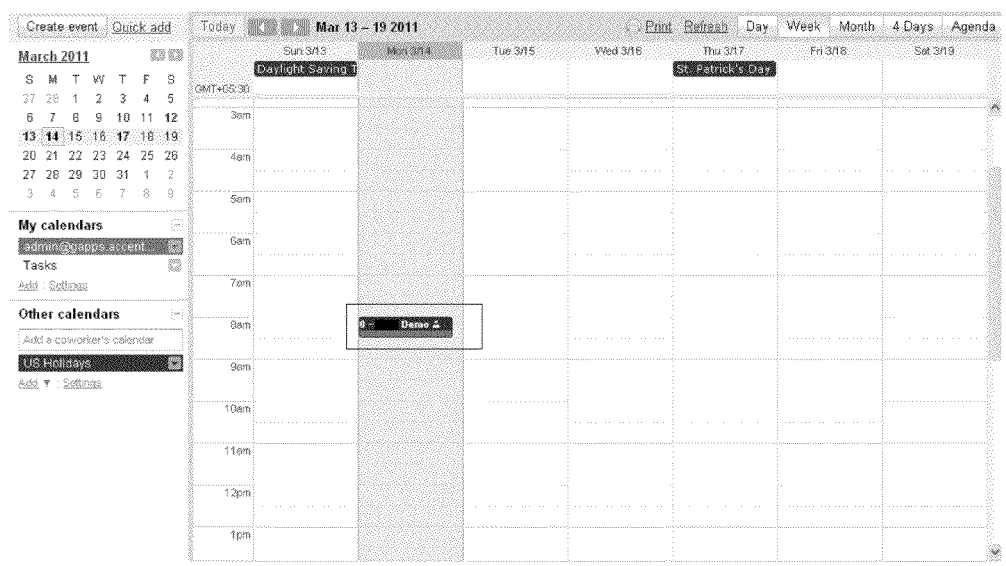

FIG. 19 illustrates an example interface 1900 from the cloud system after synchronization of the appointment has occurred. As shown, the appointment created using the interface 1700 has been replicated to the calendar maintained by the cloud system. The invite is updated to the cloud system calendar in parallel to being sent to the electronic mail address for the contact person defined in the appointment.

Figure 20:
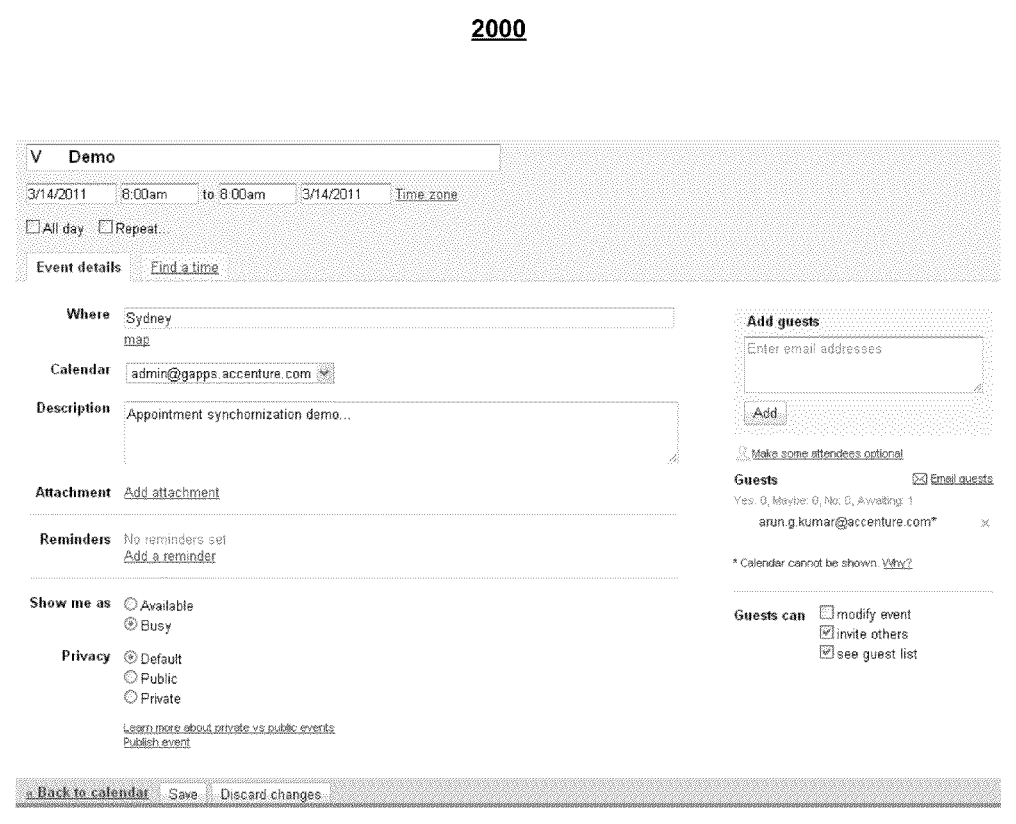

FIG. 20 illustrates an example interface 2000 from the cloud system after selection of the synchronized appointment shown in the interface 1900. The interface 2000 shows the details of the synchronized appointment. As shown, the interface 2000 displays the appointment from the CRM system and includes the data for the appointment mapped to appropriate fields of the cloud system appointment record.

Figure 21:
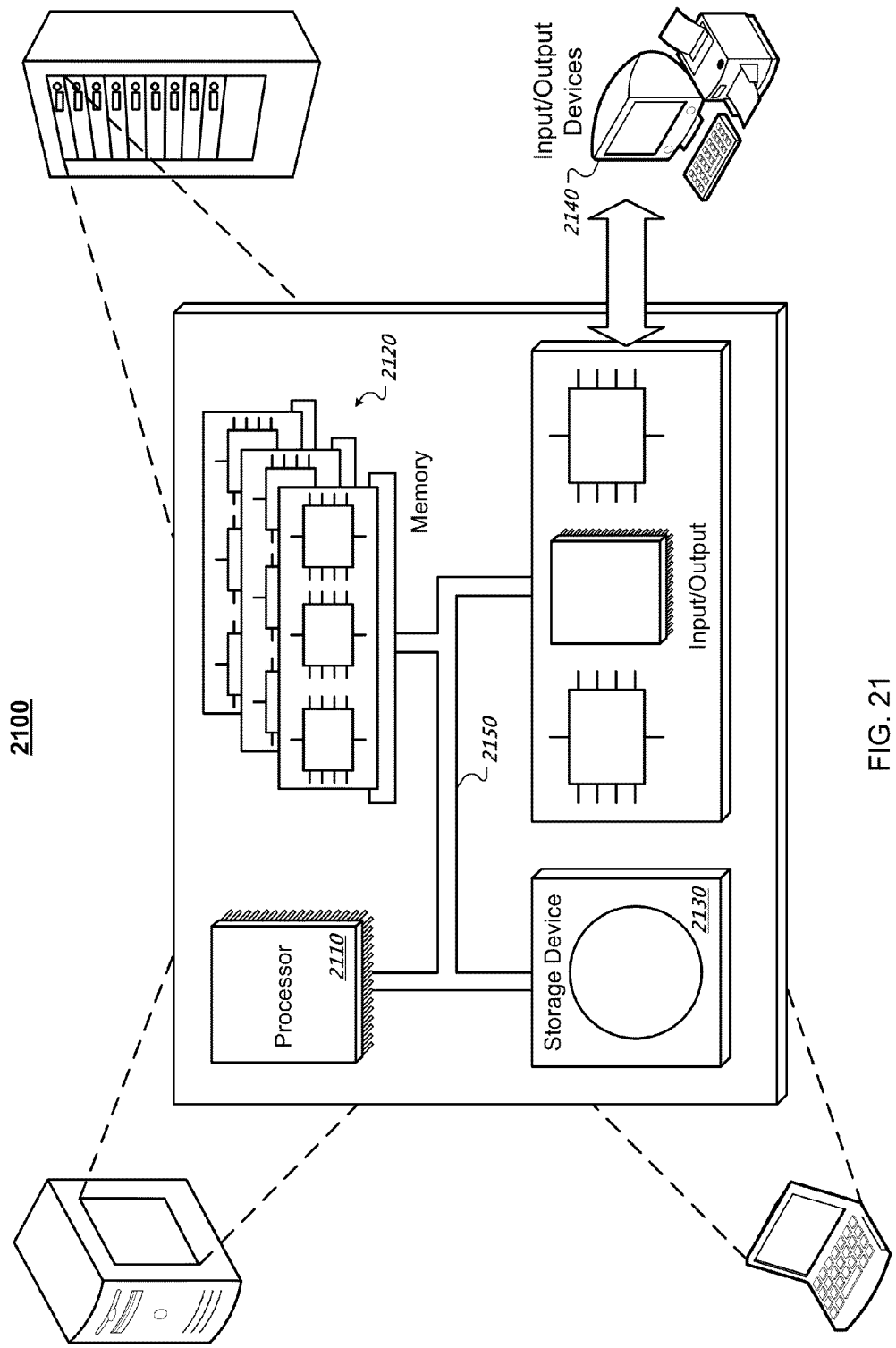
FIG. 21 is a diagram of an example system.

FIG. 21 is a schematic diagram of an example of a generic computer system 2100. The system 2100 can be used for the operations described in association with the processes described throughout this disclosure. The system 2100 may be included in the systems described throughout this disclosure.

The system 2100 includes a processor 2110, a memory 2120, a storage device 2130, and an input/output device 2140. Each of the components 2110, 2120, 2130, and 2140 are interconnected using a system bus 2150. The processor 2110 is capable of processing instructions for execution within the system 2100. In one implementation, the processor 2110 is a single-threaded processor. In another implementation, the processor 2110 is a multi-threaded processor. The processor 2110 is capable of processing instructions stored in the memory 2120 or on the storage device 2130 to display graphical information for a user interface on the input/output device 2140.

The memory 2120 stores information within the system 2100. In one implementation, the memory 2120 is a computer-readable medium. In one implementation, the memory 2120 is a volatile memory unit. In another implementation, the memory 2120 is a non-volatile memory unit.

The storage device 2130 is capable of providing mass storage for the system 2100. In one implementation, the storage device 2130 is a computer-readable medium. In various different implementations, the storage device 2130 may be a floppy disk device, a hard disk device, an optical disk device, or a tape device.

The input/output device 2140 provides input/output operations for the system 2100. In one implementation, the input/output device 2140 includes a keyboard and/or pointing device. In another implementation, the input/output device 2140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A data exchange adaptor that synchronizes data between a customer relationship management (CRM) system operated by a company and a cloud-based system operated by a third party other than the company, the CRM system being configured to provide a user interface for receipt of the data from a user, the cloud-based system being configured to store the data for the CRM system, and the data exchange adaptor comprising:
   at least one communication module;
   at least one data controller;
   at least one authentication module;
   a job scheduler that is operated by the CRM system;
   one or more processors and one or more storage devices storing instructions that are operable, when executed by the one or more processors, to cause the one or more processors to perform operations comprising:
      causing the at least one communication module to exchange data between the CRM system operated by the company and the cloud-based system operated by the third party;
      causing the at least one data controller to extract data from the at least one communication module and control storage and retrieval of data at the CRM system and the cloud-based system;
      causing the at least one authentication module to perform transport level security for communications that exchange data between the CRM system and the cloud-based system and access level security for data stored to the CRM system and the cloud-based system; and
      causing the job scheduler to control the at least one communication module, the at least one data controller, and the at least one authentication module to schedule synchronization of data between the CRM system and the cloud-based system, including triggering reverse synchronization from the cloud-based system to the CRM system, and allow the CRM system to retain control over the synchronization of data between the CRM system and the cloud-based system such that reverse synchronization from the cloud-based system to the CRM system is always triggered by the CRM system sending a reverse synchronization message to the cloud-based system.

2. The data exchange adaptor of claim 1 wherein the operations comprise:
    causing the at least one communication module to exchange calendar data between the CRM system operated by the company and the cloud-based system operated by the third party;
    causing the at least one data controller to extract calendar data from the at least one communication module and control storage and retrieval of calendar data at the CRM system and the cloud-based system; and
    causing the job scheduler to schedule synchronization of calendar data between the CRM system and the cloud-based system such that a calendar maintained by the CRM system is synchronized with a calendar maintained by the cloud-based system.

3. The data exchange adaptor of claim 1 wherein the operations comprise:
    causing the at least one communication module to exchange contact data between the CRM system operated by the company and the cloud-based system operated by the third party;
    causing the at least one data controller to extract contact data from the at least one communication module and control storage and retrieval of contact data at the CRM system and the cloud-based system; and
    causing the job scheduler to schedule synchronization of contact data between the CRM system and the cloud-based system such that contacts maintained by the CRM system are synchronized with contacts maintained by the cloud-based system.

4. The data exchange adaptor of claim 1 wherein the operations comprise:
    causing the at least one communication module to exchange task data between the CRM system operated by the company and the cloud-based system operated by the third party;
    causing the at least one data controller to extract task data from the at least one communication module and control storage and retrieval of task data at the CRM system and the cloud-based system; and
    causing the job scheduler to schedule synchronization of task data between the CRM system and the cloud-based system such that tasks maintained by the CRM system are synchronized with tasks maintained by the cloud-based system.

5. The data exchange adaptor of claim 1, wherein:
    the at least one communication module comprises at least one web service module; and
    the operations comprise causing the web service module to exchange web-based requests and responses between the CRM system operated by the company and the cloud-based system operated by the third party.

6. The data exchange adaptor of claim 5, wherein the at least one web service module comprises:
    a first web service operated on the CRM system; and
    a second web service operated on the cloud-based system,
    wherein the operations comprise causing the first web service operated on the CRM system and the second web service operated on the cloud-based system to exchange web-based requests and responses with each other.

7. The data exchange adaptor of claim 6:
    wherein the first web service operated on the CRM system is a consumer web service operated on the CRM system; and
    wherein the second web service operated on the cloud-based system is a producer web service operated on the cloud-based system.

8. The data exchange adaptor of claim 1, wherein the operations comprise causing the job scheduler to periodically initiate a synchronization process after a particular period of time has passed since a most recent synchronization process.

9. The data exchange adaptor of claim 1, wherein the operations comprise causing the job scheduler to initiate a synchronization process based on user input received to perform synchronization.

10. The data exchange adaptor of claim 1, wherein the operations comprise causing the job scheduler to initiate a synchronization process based on a change to data maintained by the CRM system.

11. The data exchange adaptor of claim 1, wherein:
    the at least one data controller comprises:
        a first data controller operated on the CRM system; and
        a second data controller operated on the cloud-based system; and
    the operations comprise:
        causing the first data controller to control storage and retrieval of data at the CRM system; and
        causing the second data controller to control storage and retrieval of data at the cloud-based system.

12. The data exchange adaptor of claim 11 wherein:
    the first data controller comprises:
        a web-based user interface,
        a first data injector,
        a first data extractor,
        first exception handler, and
        a first logging component;
    the second data controller comprises:
        a service manager,
        a second data injector,
        a second data extractor,
        a second exception handle, and
        a second logging component; and
    the operations comprise:
        causing the web-based user interface to enable selection and deselection of synchronization options and manual triggering of synchronization,
        causing the first data injector to update data received from the cloud-based system to the CRM system,
        causing the first data extractor to extract data from the CRM system and forward the extracted data to the cloud-based system for synchronization,
        causing the first exception handler to check on a variety of exceptions and errors received while synchronization is in process,
        causing the first logging component to log events on a periodic basis;
        causing the service manager to provide a controller service to access various services in the cloud-based system,
        causing the second data injector to update data received from the CRM system to the cloud-based system,
        causing the second data extractor to extract data from the cloud-based system and forward the extracted data to the CRM system for synchronization, causing the second exception handler to check on a variety of exceptions and errors received while synchronization is in process, and causing the second logging component to log events on a periodic basis.

13. The data exchange adaptor of claim 1, wherein the operations comprise causing the at least one authentication module to use a two-legged authentication mechanism to perform create, read, update, and delete operations in the cloud-based system.

14. The data exchange adaptor of claim 1, wherein the operations comprise causing the at least one authentication module to:

determine whether a consumer key and a secret for a domain are present for a requested operation;

based on a determination that a consumer key or a secret for the domain are absent for the requested operation, decline the requested operation and provide an indication that no update operation will be performed;

based on a determination that a consumer key and a secret for the domain are present for the requested operation, use a two-legged authentication process to authorize the consumer key and the secret for the domain; and based on authorizing the consumer key and the secret for the domain, make a subsequent request to perform the requested operation.

15. The data exchange adaptor of claim 1:

wherein the at least one communication module comprises a first web service operated on the CRM system and a second web service operated on the cloud-based system;

wherein the at least one authentication module comprises a first encryption mechanism operated on the CRM system and a second encryption mechanism operated on the cloud-based system;

wherein the at least one data controller comprises a cloud data controller operated on the cloud-based system; and wherein the operations comprise:

causing the first web service to access data stored by the CRM system, initiate the first encryption mechanism, and provide a request/response object to the first encryption mechanism;

causing the first encryption mechanism to encrypt a system provided key, add the system provided key to the request/response object, and provide an updated version of the request/response object to the first web service;

causing the first web service to send the updated version of the request/response object to the second web service;

causing the second web service to receive the updated version of the request/response object and provide the updated version of the request/response object to the second encryption mechanism;

causing the second encryption mechanism to segregate the encrypted key from the updated version of the request/response object, validate the segregated key against a reference key provided to the cloud-based system in advance, and forward the validated request/response object to the second web service for further processing;

causing the second web service to forward the validated request/response object to the cloud data controller; and causing the cloud data controller to perform a data synchronization operation based on the validated request/response object.

16. At least one non-transitory computer-readable storage medium encoded with executable instructions that, when executed by at least one processor, cause the at least one processor to perform operations comprising:

exchanging data between a customer relationship management (CRM) system operated by a company and a cloud-based system operated by a third party other than the company, the CRM system being configured to provide a user interface for receipt of the data from a user and the cloud-based system being configured to store the data for the CRM system;

controlling storage and retrieval of data at the CRM system and the cloud-based system;

performing transport level security for communications that exchange data between the CRM system and the cloud-based system and access level security for data stored to the CRM system and the cloud-based system; and scheduling synchronization of data between the CRM system and the cloud-based system, including triggering reverse synchronization from the cloud-based system to the CRM system, in a manner that allows the CRM system to retain control over the synchronization of data between the CRM system and the cloud-based system such that reverse synchronization from the cloud-based system to the CRM system is always triggered by the CRM system sending a reverse synchronization message to the cloud-based system.

17. A method comprising:

using at least one communication module to exchange data between a customer relationship management (CRM) system operated by a company and a cloud-based system operated by a third party other than the company, the CRM system being configured to provide a user interface for receipt of the data from a user and the cloud-based system being configured to store the data for the CRM system;

using at least one data controller to extract data from the at least one communication module and control storage and retrieval of data at the CRM system and the cloud-based system;

using at least one authentication module to perform transport level security for communications that exchange data between the CRM system and the cloud-based system and access level security for data stored to the CRM system and the cloud-based system; and using a job scheduler that is operated by the CRM system to schedule synchronization of data between the CRM system and the cloud-based system, including triggering reverse synchronization from the cloud-based system to the CRM system, and allow the CRM system to retain control over the synchronization of data between the CRM system and the cloud-based system such that reverse synchronization from the cloud-based system to the CRM system is always triggered by the CRM system sending a reverse synchronization message to the cloud-based system.

18. The method of claim 17 comprising:

using a web-based user interface that is operated by the CRM system to enable selection and deselection of synchronization options and manual triggering of synchronization, using a first data injector that is operated by the CRM system to update data received from the cloud-based system to the CRM system, using a second data extractor that is operated by the CRM system to extract data from the CRM system and forward the extracted data to the cloud-based system for synchronization, using a first exception handler that is operated by the CRM system to check on a variety of exceptions and errors received while synchronization is in process, using a first logging component that is operated by the CRM system to log events on a periodic basis;

using a service manager that is operated by the cloud-based system to provide controller service to access various services in the cloud-based system, using a second data injector that is operated by the cloud-based system to update data received from the CRM system to the cloud-based system, using a second data extractor that is operated by the cloud-based system to extract data from the cloud-based system and forwarding the extracted data to the CRM system for synchronization, using a second exception handler that is operated by the cloud-based system to check on a variety of exceptions and errors received while synchronization is in process, and using a second logging component that is operated by the cloud-based system to log events on a periodic basis.

19. The non-transitory computer-readable storage medium of claim 16 the operations comprising:

enabling, using a web-based user interface included in the CRM system, selection and deselection of synchronization options and manual triggering of synchronization, updating, using a first data injector included in the CRM system, data received from the cloud-based system to the CRM system, extracting, using a first data extractor that is operated by the CRM system, data from the CRM system and forwarding the extracted data to the cloud-based system for synchronization, checking, using a first exception handler that is operated by the CRM system, a variety of exceptions and errors received while synchronization is in process, logging, using a first logging component that is operated by the CRM system, events on a periodic basis;

providing, using a service manager that is operated by the cloud-based system, controller service to access various services in the cloud-based system, updating, using a second data injector that is operated by the cloud-based system, data received from the CRM system to the cloud-based system, extracting, using a second data extractor that is operated by the cloud-based system, data from the cloud-based system and forwarding the extracted data to the CRM system for synchronization, checking, using a second exception handler that is operated by the cloud-based system, a variety of exceptions and errors received while synchronization is in process, and logging, using a second logging component that is operated by the cloud-based system, events on a periodic basis.

* * * * *

UNITED STATES PATENT AND TRADEMARK OFFICE
CERTIFICATE OF CORRECTION

Page 1 of 1

PATENT NO.         : 9,059,894 B2
APPLICATION NO.    : 13/598947
DATED              : June 16, 2015
INVENTOR(S)        : Saurabh Saraswat et al.

It is certified that error appears in the above-identified patent and that said Letters Patent is hereby corrected as shown below:

In the Claims

In claim 12, column 16, line 44, delete "handle," and insert -- handler, --.

Signed and Sealed this
Eighth Day of December, 2015

Michelle K. Lee
*Director of the United States Patent and Trademark Office*